United States Patent Office 3,463,823
Patented Aug. 26, 1969

3,463,823
DIVINYL ACETALS BY DEHYDROHALOGENATION OF BIS(2-HALOETHYL) ACETALS
Joseph Vebra, New Haven, John A. Wojtowicz, East Haven, and Venkataramaraj S. Urs, Cheshire, Conn., assignors to Olin Mathieson Chemical Corporation
No Drawing. Filed Feb. 2, 1967, Ser. No. 613,447
Int. Cl. C07c 43/14, 43/00, 43/30
U.S. Cl. 260—615     3 Claims

ABSTRACT OF THE DISCLOSURE

Process for preparing a divinyl acetal by dehydrohalogenating the corresponding bis(2-haloethyl) acetal in the presence of a solution of an alkali metal alcoholate of certain highly-branched secondary or tertiary alcohols or glycols in the same alcohol or glycol or in the presence of a dispersion of a finely-divided, alkali metal hydroxide in the highly-branched secondary or tertiary alcohols or glycols.

---

This invention relates to a process for the synthesis of divinyl acetals. More particularly, this invention relates to an improved process for the preparation of divinyl acetals by dehydrohalogenation of the corresponding bis(2-chloro-, iodo-, or bromo-ethyl) acetal in the presence of a solution of an alcoholate of certain highly-branched, secondary or tertiary alcohols or glycols in the same alcohol or glycol or in the presence of a dispersion of a finely-divided, alkali metal hydroxide in the highly-branched secondary or tertiary alcohols or glycols.

The divinyl acetals of this invention have the formula:

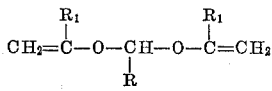

wherein $R_1$ is hydrogen or alkyl of from 1 to 4 carbon atoms; R is selected from the group consisting of alkyl of from 1 to 10 carbon atoms, the radical:

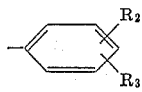

wherein $R_2$ and $R_3$ are independently selected from the group consisting of hydrogen and alkyl groups of from 1 to 5 carbon atoms, the radical:

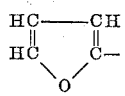

the radical $R_5OR_4$— wherein $R_4$ is alkylene of from 1 to 4 carbon atoms and $R_5$ is alkyl of from 1 to 4 carbon atoms or vinyl.

Typical of the wide variety of divinyl acetals which can be prepared by the process of this invention are the following:

divinyl formal
divinyl isobutyral
divinyl-(2-methyl) benzal
diisopropenyl formal
divinyl furfural
divinyl methoxy ethanal
divinyl dimethyl benzal
divinyl-n-propoxypropanal
divinyl-vinyloxypropanal
divinyl acetal
divinyl propional
divinyl-(4-methyl) benzal
diisopropenyl butyral
divinyl hexanal
divinyl ethoxypropanal
divinyl substituted benzals
divinyl butyral
divinyl isoamylal
divinyl benzal
divinyl heptanal
divinyl-metamethyl benzal Divinyl ketals of acetone, cyclohexanone and benzophenone may, likewise, be prepared using the above process to dehydrohalogenate the corresponding bis(2-haloethyl) ketal.

The art is aware of a number of processes for the preparation of divinyl acetals, however, all of these methods suffer from one or more disadvantages. In one method, divinyl acetals are prepared by dehydrochlorination of the corresponding bis(2-chloroethyl) acetals in the presence of sodium hydroxide, potassium hydroxide or a metal alkoxide, such as potassium tertiary butoxide. However, under these conditions the yield of the divinyl acetals is low (less than 50 percent) and the high temperatures utilized (i.e., 300° C. with fused KOH) cause many undesirable side reactions, such as the Guerbet reaction, to take place. Also, at high temperatures alkenyl 2-haloethyl ethers, which are very difficult to remove from the product and which are particularly harmful in the product since a trace can operate as a chain terminator in the polymerization of the divinyl acetal, are formed.

By the process of this invention high yields (over 75 percent of divinyl acetals) are achieved in the dehydrochlorination of bis(2-haloethyl) acetals. Siedel and Assal in German Patent 895,452 (1953) teach that sodium alcoholates of tertiary butanol, tertiary amyl alcohol, etc., dispersed in an excess of the alcohol can be employed in dehydrochlorinating bis(2-chloroethyl) acetals but the yields of the divinyl acetals by their process is low (less than 40 percent).

It has been discovered when bis(2-haloethyl) acetals are added to a hot, alkali metal alcoholate solution, formed by dissolving an alkali metal alcoholate of certain highly-branched secondary and tertiary alcohols or diols in the alcohol or glycol, that divinyl acetals are surprisingly obtained, surprisingly, in yields as high as 75 percent or more. For example, if bis(2-chloroethyl) formal is dehydrohalogenated in the presence of the sodium alcoholate of 2,7-dimethyl octane-2,7-diol dissolved in an excess (2- volumes) of the same diol the divinyl formal is formed in 88 percent yield while Siedel and Assal's method, utilizing the potassium alcoholate of isoamyl alcohol, gave divinyl formal in less than 40 percent yield. In contrast, when the sodium alcoholates of high boiling secondary alcohols, such as trimethyl nonanol or diisobutyl carbinol, dissolved in an excess of the alcohol, are employed in the dehydro chlorination of bis(2-chloroethyl) butyral by the process of this invention divinyl butyral in yields of 81 to 83 percent or more are achieved.

In the process of this invention the quantity of the alcoholic compound, that is, the alcohol or glycol utilized in preparing the alcoholate solution is not critical, however generally from about 1 to 10 moles or more per mole of the alcoholate is employed.

Examples of the highly-branched secondary and tertiary alcohols and glycols useful in the process of this invention include the following:

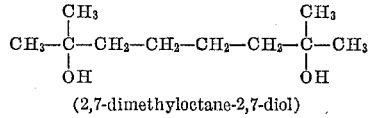

(2,7-dimethyloctane-2,7-diol)

$$CH_3-CH_2-CH_2-CH_2-\underset{\underset{OH}{|}}{\overset{\overset{C_2H_5}{|}}{C}H}-CH_2-CH_2-CH-CH_2-\overset{\overset{CH_3}{|}}{C}H-CH_3$$

(7-ethyl-2-methyl-4-undecanol)

$$CH_3-\overset{\overset{CH_3}{|}}{C}H-CH_2-\overset{\overset{CH_3}{|}}{C}H-CH_2-\underset{\underset{OH}{|}}{C}H-CH_2-\overset{\overset{CH_3}{|}}{C}H-CH_3$$

(2,6,8-trimethyl-4-nonanol)

$$CH_3-\overset{\overset{CH_3}{|}}{C}H-CH_2-\underset{\underset{OH}{|}}{C}H-CH_2-\overset{\overset{CH_3}{|}}{C}H-CH_3$$

(2,6-dimethyl-4-heptanol)

The highly-branched, secondary or tertiary alcohols and glycols useful in the process of this invention have boiling points ranging from about 150° C. to about 350° C. and preferably between 150° to 250° C. Such alcohols and glycols have OH groups shielded between bulky methyl and other alkyl groups, presumably with less or no tendency for dehydration. In contrast, when a much less protected high-boiling, secondary alcohol, such as octanol-2 having the formula:

$$CH_3-\overset{\overset{OH}{|}}{C}H-CH_2-CH_2-CH_2-CH_2-CH_2-CH_3$$

is employed in the dehydrochlorination reaction, the yield is low. If the sodium alcoholate of octanol-2 dissolved in an excess of octanol-2 is employed in the dehydrochlorination of bis(2-chloroethyl) formal or bis(2-chloroethyl) butyral, the yield of divinyl acetal formed is about 50 percent. When an alcohol, such as octanol-2 is utilized, several side reaction products are formed in substantial quantities through dehydration of the alcohol to give long chain olefins or by reaction with the bis(2-chloroethyl) acetal to form an ether-acetal.

Cretcher et al. [J. Am. Chem. Soc., vol. 47, pages 163–166 and pages 1368–74 (1925)] found that sodium hydroxide dispersed in lower alcohols gave a condensation product of tetralkyl ether instead of vinyl alkyl ether, when attempts were made to dehydrochlorinate β-chloroethers. Unexpectedly, it has been discovered that the dehydrochlorination of bis(2-haloethyl) acetals in the presence of a dispersion of a finely-divided alkali metal hydroxide (100 mesh or finer such as sodium, potassium or lithium hydroxide, dissolved in a highly-branched, secondary or tertiary alcohol of the type referred to above, results in yields of divinyl acetals in the range of 75 percent or more. Further, the larger the difference between the boiling points of the alcohol or glycol and of the divinyl acetal, the better the yield of divinyl acetal. In contrast, the use of potassium hydroxide dispersed in diethylene glycol (an unhindered primary glycol) yields only about 14 percent of the divinyl formal and the use of sodium hydroxide with the same glycol gives only a few percent of the divinyl formal.

When sodium hydroxide or potassium hydroxide is used as a suspension in the alcohols and glycols, it is preferable to use powdered sodium or potassium hydroxide in preparing the suspension or dispersion. However, it is possible to add an aqueous solution of sodium or potassium hydroxide to the alcohol or glycol of this invention and then strip off the water by distillation (i.e., by azeotroping with benzene, etc., or by fractional distillation at atmospheric or reduced pressure). A number of other methods are known in the art for preparing dispersions of this type. For example, a mixture of the solid alkali metal hydroxide and the alcohol may be milled together in a ball mill to form the desired dispersion. The concentration of the alkali metal hydroxide in the dispersions employed in the process of this invention will be up to about 50 percent by weight of the alkali metal hydroxide based on the total weight of the alkali metal hydroxide and the alcohol or glycol and preferably from about 10 to about 35 percent by weight of the alkali metal hydroxide on the same basis. For each mole of the bis(2-haloethyl) acetal charged to the dehydrohalogenation process, a quantity of the dispersion sufficient to contain about 2.2 to about 10 moles or more and preferably about 2.5 to 5 moles of the alkali metal hydroxide is utilized.

Other strong bases, such as quaternary ammonium hydroxide and lithium, cesium or rubidium hydroxide, etc. may be utilized as suspensions in the alcohols or glycols employed in the dehydrochlorination process of this invention.

The temperature of the dehydrohalogenation reaction of this invention will vary from about 125° C. to about 250° C. and preferably will be between about 150° and 225° C. In preparing any particular divinyl acetal by the process of this invention, the highly-branched, secondary or tertiary alcohol selected is one having a boiling point higher than that of the divinyl acetal being produced and the dehydrohalogenating temperature is chosen so that the temperature of the hot alkali metal alcoholate solution or of the dispersion of the finely-divided, alkali metal hydroxide in the alcohol or glycol is above the boiling point of the resulting divinyl acetal. Preferably, the divinyl acetal is distilled from the reaction mixture as it is formed.

Many methods are known in the art for the preparation of the bis(2-chloro-, iodo- or bromo-ethyl) acetals employed in the process of this invention. For example, bis-(2-chloro-ethyl) formal can be obtained by heating a mixture of paraformaldehyde, ethylene chlorohydrin and powdered, freshly ignited calcium chloride. Likewise, bis-(2-bromo-ethyl) acetal can be synthesized by heating a mixture of paraformaldehyde (60 parts), powdered freshly ignited calcium chloride (60 parts) and ethylene bromohydrin (500 parts) in a one-liter flask overnight on a steam bath. The resulting formal is separated from the aqueous layer, washed several times with water, dried over magnesium sulfate and finely distilled to yield 445 parts of bis(2-bromoethyl) formal.

Alcohols suitable for use in the process of this invention for the preparation of alkali metal alcoholates or suitable for the preparation of dispersions of finely-divided alkali metal hydroxide include those alcohols having boiling points between about 150° C. and about 350° C. and having the following formula:

$$R_4-\underset{\underset{R_6}{|}}{\overset{\overset{R_5}{|}}{C}}-\underset{\underset{OH}{|}}{\overset{\overset{R_7}{|}}{C}}-\underset{\underset{R_9}{|}}{\overset{\overset{R_8}{|}}{C}}-R_{10}$$

wherein $R_4$ and $R_{10}$ are alkyl of from 1 to 8 carbon atoms and $R_5$, $R_6$, $R_7$, $R_8$ and $R_9$ are independently selected from the group consisting of hydrogen or alkyl of from 1 to 4 carbon atoms, and wherein the sum of the carbon atoms in $R_4$, $R_5$, $R_6$, $R_7$, $R_8$, $R_9$ and $R_{10}$ is from 3 to 15 inclusive and with the proviso that when the sum of $R_4$, $R_5$, $R_6$, $R_7$, $R_8$, $R_9$ and $R_{10}$ is 3 that $R_{10}$ is methyl and one of $R_5$, $R_7$, and $R_8$ is methyl. Glycols suitable for use in the process of this invention include those having boiling points between 150° C. and 350° C. and having the following formula:

$$R_{11}-\underset{\underset{OH}{|}}{\overset{\overset{R_{12}}{|}}{C}}-(CH_2)_m-\left(\overset{\overset{R_{13}}{|}}{C}H\right)_n-(CH_2)_p-\underset{\underset{OH}{|}}{\overset{\overset{R_{14}}{|}}{C}}-R_{15}$$

wherein $m$ and $p$ are integers of from 0 to 10, $n$ is an integer of from 0 to 1 inclusive, wherein $R_{11}$, $R_{12}$, $R_{13}$, $R_{14}$, and $R_{15}$ are alkyl of from 1 to 3 carbon atoms, the sum of the carbon atoms in $R_{11}$, $R_{12}$, $R_{13}$, $R_{14}$ and $R_{15}$ is not more than 10 and with the proviso that when $n$ is 0 then $p$ is 0 and $m$ has a value of from 1 to 10.

Examples of highly-branched alcohols and glycols useful in the process of this invention includes:

2,3-dimethyl-3-pentanol 2,4-dimethyl-3-pentanol
3-methyl-3-pentanol
2,3,3-trimethyl-3-pentanol
2,2,4-trimethyl-3-pentanol
2,3,4-trimethyl-3-pentanol
2,3,4,4-tetramethyl-3-pentanol
2,3-dimethyl-3-hexanol
2,4-dimethyl-3-hexanol
3,4-dimethyl-3-hexanol
2,4-dimethyl-4-hexanol
3-heptanol
4-heptanol
2,5-dimethyl-4-heptanol
3-ethyl-3-heptanol
2,2-dimethyl-3-heptanol
4-methyl-4-octanol
3-methyl-3-octanol
5-nonanol
2,6,8-trimethyl-4-nonanol
2-methyl-7-ethyl-4-undecanol
3,9-diethyl-6-tridecanol
2,4-diethyl-2,4-pentanediol
2,5,7-trimethyl-2,7-octanediol
2-isopropyl-7-ethyl-2,7-octanediol
2-ethyl-4-isopropyl-7-methyl-2,7-octanediol
2,7-dimethyl-2,7-octanediol
2,5-di-n-propyl-2,5-hexanediol
2,5-dimethyl-2,5-hexanediol
2,6-diethyl-2,7-hexanediol
2-methyl-6-isopropyl-2,6-heptanediol
2,13-di-n-propyl-2,13-tetradecanediol
2,13-dimethyl-5-ethyl,2,13-tetradecanediol
2,15-dimethyl-2,15-hexadecanediol
2-methyl-5-n-propyl-17-isopropyl-2,17-octadecanediol
2,18-diisopropyl-2,18-nonadecanediol Alkali metal alcoholates of the useful highly-branched alcohols or glycols can be conveniently prepared by a number of methods known in the art. For example, the sodium alcoholate of 2,6,8-trimethyl-4-nonanol, which has the formula:

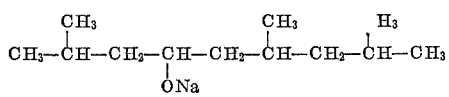

can be prepared by dissolving metallic sodium in 2,6,8-trimethyl-4-nonanol and heating the solution to about 120° C.

The divinyl acetals can be polymerized alone or with other polymerizable unsaturated compounds. The polymerization reaction can be effected in solution, in bulk, by the suspension technique or by the emulsion method. Catalysts, such as peroxides and polyvalent metal salts can be utilized to accelerate the rate of polymerization when used alone or together with heat or ultraviolet light. For example, if 10 parts of divinyl formal is dissolved in 15 parts of benzene containing 0.5 part of stannous chloride and allowed to stand for 96 hours at room temperature, a viscous solution is formed. After the solution has been washed with water dried over anhydrous magnesium sulfate and filtered, and the filtrate containing the polymer can be flowed onto a glass plate yielding, on evaporation, a colorless and moderately hard film. Copolymers of divinyl formal and methylmethacrylate, for example, can be obtained by bulk polymerization of a mixture of the monomers in the presence of benzoyl peroxide catalyst at 45° C. for about 3 days. Such copolymers can be molded under elevated pressure and temperature to form clear, colorless specimens. For additional information concerning the polymerization of divinyl acetals and the formulation of copolymers of divinvyl acetals with methyl methacrylate, vinyl acetate, vinyl chloride, methyl vinyl ketone, etc. reference is made to Coffman U.S. Patent 2,374,078.

The following examples illustrate various embodiments of this invention and are to be considered not limitative:

EXAMPLE I

Divinyl formal

Twenty-three grams (1 g.-atom) of metallic sodium was dissolved in 146 g. (0.84 g. mole) of 2,7-dimethyl-2,7-octanediol and the mixture was heated to 190° to 210° C. Sodium alcoholate formed in situ remained dissolved in an excess of the glycol to give a homogeneous solution, the evolved hydrogen gas was vented. To the alcoholate solution 43 g. (0.25 g.-mole) of bis(2-chloroethyl) formal was added gradually over a thirty minute interval after which heating was continued for another 10 minutes. The divinyl formal was distilled from the reaction mixture as it was formed. Twenty-seven grams of distillates was collected during the 40 minute period. The distillate was fractionally distilled through a 30 cm. packed-column and 2 g. of pure divinyl formal (B.P. 89–91° C., $n_d^{25}$ 1.4128) was obtained. Based on the weight of pure divinyl formal recovered, the yield was 88 percent of the theoretical.

EXAMPLE II

Divinyl formal 72.5 g. (3.15 g. atoms) of metallic sodium was dissolved in 1667 g. (9 g. moles) of 2,6,8-trimethyl-4-nonanol and the solution was heated to 120° C. The evolved hydrogen was vented and it was found that the exotherm of the reaction raised the temperature of the mixture to 170° C. A clear solution of the sodium alcoholate in the excess alcohol was obtained. 260 g. (1.5 g.-moles) of bis(2-chloroethyl) formal was gradually added to the sodium alcoholate-alcohol solution over a period of 22 minutes. Heating was continued and over a total time of 54 minutes 166 g. of distillate ($n_d^{25}$ 1.4150) was collected. The distillate was fractionated through 25 cm.-packed column yielding 124.6 g. of pure divinyl formal (B.P. 89 C., $n_d^{25}$ 1.4129). The percentage in-hand yield of divinyl formal was 83 percent (theoretical yield 150 g.).

EXAMPLE III

Divinyl butyral 72.5 (3.15 g. atoms) of metallic sodium was dissolved in 1667 g. (9 g. moles) of 2,6,8-trimethyl-14-nonanol as in Example II to give a clear solution of the sodium alcoholate in an excess of the alcohol. The temperature of the solution was raised to 170° C. and 323 g. (1.5 g. moles) of bis(2-chloroethyl) butyral was added over a period of 28 minutes. Heating and distillation was continued for an additional period of 35 minutes after the bis(2-chloroethyl)butyral had been added. The divinyl butyral was distilled from the reaction mixture as it was formed. Over a period of 63 minutes, a total of 245 g. of distillate was collected. Fractional distillation of the distillate gave 176 g. of pure divinyl butyral (B.P. 142° C., $n_d^{25}$ 1.4222). Percentage in-hand yield of divinyl butyral was 82.6 (theoretical yield 213 g.).

EXAMPLE IV

Dehydrochlorination of bis(2-chloroethyl) butyral with sodium hydroxide dispersed in diiso-butyl carbinol Powdered sodium hydroxide (208 g., 5.2 moles) was dispersed in 500 milliliters of diisobutyl carbinol and the mixture was heated to 190°–205° C. Then 277 g. (1.29 moles) of bis(2-chloroethyl) butyral was gradually added over a period of 45 minutes. Simultaneously, a distillate was collected which separated into two layers—an organic and a water layer. The organic layer was fractionated using a packed column, yielding 151 g. of pure divinyl butyral (B.P. 142° C.). The in-hand yield of divinyl butyral was 82 percent (theoretical yield 183 g.).

EXAMPLE V

Example IV was repeated using 2,6,8-trimethyl-4-nonanol instead of 2,6-dimethyl-4-heptanol. The in-hand yield of divinyl butyral was 81 percent.

EXAMPLE VI

A total of 840 g. (4 g.-moles) of 2-methyl-7-ethyl-4-undecanol was placed in a three-liter, 3-necked flask provided with a mechanical stirrer, a dropping funnel and a distillation head. 48.3 g. (2.10 g.-atom) of metallic sodium, cut into small pieces, was added. The mixture was heated to about 100° C. at which temperature the metallic sodium dissolved in the 2-methyl-7-ethyl-4-undecanol liberating hydrogen gas which was vented. The exotherm of the reaction raised the temperature of the contents of the flask to about 140° C. and a clear solution of sodium alcoholate in the excess of the 2-methyl-7-ethyl-4-undecanol was formed after about an hour. Then the alcoholate solution was heated to 170–175° C. and 215 g. of bis(2-chloroethyl) butyral was added over a period of 30 minutes. The divinyl butyral formed was distilled from the reaction flask over a temperature range of 140–145° C. Crude divinyl butyral in the amount of 132 g. collected in this preparation was redistilled using a high-efficiency (30 theoretical plate), packed distillation column yielding 125 g. (88 percent of theory of pure divinyl butyral (B.P. 142° C.)).

To illustrate the criticality of the acohols and glycols useful in this invention, Example IV was repeated using diethylene glycol instead of 2,6-dimethyl-4-heptanol carbinol. The in-hand yield of divinyl butyral was only 16 percent. In another experiment, Example IV was repeated using octanol-2 in place of 2,6-dimethyl-4-heptanol. The in-hand yield of divinyl butyral was only 27 percent.

What is claimed is:

1. A process for the preparation of divinyl butyral which comprises dehydrohalogenating bis(2-chloroethyl) butyral at a temperature of between about 150° and 225° C. in the presence of a dispersion of a finely-divided alkali metal hydroxide in an alcohol having a boiling point between about 150° and 350° C. and having the formula:

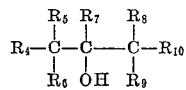

wherein $R_4$ and $R_{10}$ are alkyl of from 1 to 8 carbon atoms and $R_5$, $R_6$, $R_7$, $R_8$, and $R_9$ are independently selected from the group consisting of hydrogen or alkyl of from 1 to 4 carbon atoms, and wherein the sum of the carbon atoms in $R_4$, $R_5$, $R_6$, $R_7$, $R_8$, $R_9$ and $R_{10}$ is from 3 to 15 inclusive, and with the proviso that when the sum of $R_4$, $R_5$, $R_6$, $R_7$, $R_8$, $R_9$, and $R_{10}$ is 3 that $R_{10}$ is methyl and one of $R_5$, $R_7$ and $R_8$ is methyl, and the divinyl butyral is distilled from the reaction mixture as it is formed.

2. The process of claim 1 wherein the said dispersion of a finely-divided alkali metal hydroxide in an alcoholic compound is a dispersion of finely-divided sodium hydroxide in 2,6-dimethyl-4-heptanol.

3. The process of claim 1 wherein the said dispersion of a finely-divided alkali metal hydroxide in an alcoholic compound is a dispersion of finely-divided sodium hydroxide in 2,6,8-trimethyl-4-nonanol.

References Cited

UNITED STATES PATENTS

| | | |
|---|---|---|
| 2,299,189 | 10/1942 | Swan. |
| 2,374,078 | 4/1945 | Coffman. |
| 2,962,534 | 11/1960 | Montagna et al. |
| 3,285,969 | 11/1966 | Tolbert et al. |

FOREIGN PATENTS

| | | |
|---|---|---|
| 895,452 | 9/1953 | Germany. |

OTHER REFERENCES

Matsoyan et al.: Zhur. Obshchei Khim 30, 697–8 (1960).

LEON ZITVER, Primary Examiner

H. T. MARS, Assistant Examiner

U.S. Cl. X.R.

260—611, 347.8